(12) United States Patent
Sando et al.

(10) Patent No.: US 6,835,313 B2
(45) Date of Patent: Dec. 28, 2004

(54) EXTRACTING METHOD, STRUCTURE AND APPARATUS, AND SEPARATING METHOD, STRUCTURE AND APPARATUS

(75) Inventors: Yasuhiro Sando, Amagasaki (JP); Yasuhisa Fujii, Kyoto (JP); Shunichi Hayamizu, Amagasaki (JP); Koji Yamamoto, Kawanishi (JP)

(73) Assignee: Minolta Co., Ltd., Osaka (JP)

( * ) Notice: Subject to any disclaimer, the term of this patent is extended or adjusted under 35 U.S.C. 154(b) by 133 days.

(21) Appl. No.: 10/161,255

(22) Filed: May 31, 2002

(65) Prior Publication Data

US 2002/0179528 A1 Dec. 5, 2002

(30) Foreign Application Priority Data

Jun. 4, 2001 (JP) ........................................ 2001-168047

(51) Int. Cl.[7] .............................................. B01D 11/00
(52) U.S. Cl. ...................... 210/634; 137/833; 204/450; 204/600; 210/511; 422/69; 436/178
(58) Field of Search .............................. 210/198.2, 243, 210/321.6, 321.84, 503, 505, 511, 522, 634, 635, 644, 650, 651, 656, 806; 137/833; 366/336–341; 204/450–453, 600–605; 422/69, 101; 436/178

(56) References Cited

U.S. PATENT DOCUMENTS

| | | | |
|---|---|---|---|
| 3,989,467 A | * 11/1976 | Paige | .......................... 422/257 |
| 4,313,830 A | * 2/1982 | Tulin et al. | .................. 210/639 |
| 4,789,468 A | * 12/1988 | Sirkar | .......................... 210/137 |
| 5,932,100 A | * 8/1999 | Yager et al. | ................. 210/634 |
| 5,961,832 A | * 10/1999 | Shaw et al. | .................. 210/634 |
| 5,971,158 A | * 10/1999 | Yager et al. | ................. 209/155 |
| 6,027,651 A | * 2/2000 | Cash | ........................... 210/662 |
| 6,136,272 A | * 10/2000 | Weigl et al. | ............. 422/82.05 |
| 6,368,871 B1 | * 4/2002 | Christel et al. | ............. 436/180 |
| 6,454,945 B1 | * 9/2002 | Weigl et al. | ................. 210/634 |
| 2002/0071788 A1 | 6/2002 | Fujii et al. | |
| 2002/0108885 A1 | 8/2002 | Fujii et al. | |

* cited by examiner

*Primary Examiner*—Joseph Drodge
(74) *Attorney, Agent, or Firm*—Sidley Austin Brown & Wood LLP

(57) ABSTRACT

Disclosed herewith is an extracting structure for incorporating a substance contained in a first liquid into a second liquid. The extracting structure comprises: a channel for allowing the first liquid and the second liquid to flow therein in a form of a layered flow in which first laminar flows of the first liquid and second laminar flows of the second liquid alternately come in contact with each other, wherein the substance in the first laminar flow of the first liquid moves to the second laminar flow of the second liquid through the boundaries between the first laminar flows and the second laminar flows; and a separating section, connected to a lower stream side of the channel, for separating the second liquid from the first liquid. Further, disclosed also herewith is a separating structure for separating a second liquid from the mixture of a first liquid and the second liquid.

41 Claims, 8 Drawing Sheets

EXTRACTING METHOD, STRUCTURE AND APPARATUS, AND SEPARATING METHOD, STRUCTURE AND APPARATUS

CROSS-REFERENCE TO RELATED APPLICATION

This application is based on Japanese Patent Application No. 2001-168047 filed in Japan on Jun. 4, 2001, the entire content of which is hereby incorporated by reference.

BACKGROUND OF THE INVENTION

1. Field of the Invention

The present invention relates to an extracting method, an extracting apparatus, a separating method and a separating apparatus. The invention relates to a technique for selectively extracting an object contained in a liquid.

2. Description of the Related Art

In recent years, dioxin or the like generated from garbage incinerators and the like is recognized as serious environmental problem, and it is an important problem to measure and manage a discharge density of the dioxin. Currently, a method of measuring a density of the dioxin or the like is defined by Japanese Industrial Standards (JIS).

In the case where the dioxin or the like is measured, in order to extract the dioxin contained in water, similarly to a conventional solvent extracting method, water and an organic solvent are put into a separating funnel or the like and are shaken to be mixed, the dioxin in the water is incorporated into the organic solvent and only the organic solvent is extracted so as to be separated from the water.

However, this method requires a lot of solvent, long time and a lot of costs.

Recently, an attention is paid to $\mu$-TAS ($\mu$-Total Analysis System) which refines chemical analysis and synthesizing apparatuses and chemical analysis and synthesizing methods using a micromachine technique. The $\mu$-TAS, which is refined more finely as compared with conventional apparatuses, has the merits such that an amount of samples is small, reacting time is short and an amount of refuse is small. In the case where the $\mu$-TAS is adapted to the environment measuring field or the like, it has the merits that usage of reagent and organic solvent is small and reacting time (measuring time) is short, and further since an apparatus is small, the measurement can be made on the ground, so that the immediacy of an inspection is expected to be improved.

However, conventionally a technique for extracting a solvent using a micro fluid system to which the micromachine technique is applied has not been found.

For example, in a very narrow channel having a width of several dozen to several hundred $\mu$m, the viscosity of a liquid is dominant, and it is difficult to stir and mix liquids. For this reason, in order to incorporate the dioxin contained in the water into the organic solvent, it is inefficient to stir water and organic solvent in a channel.

In addition, it is desirable that only an organic solvent is extracted from a small amount of mixed water and organic solvent in a microarea and to separate it from the water.

SUMMARY OF THE INVENTION

Therefore, a first technical problem to be solved by the invention is to provide an extracting method, an extracting apparatus and a chip for the extracting apparatus which incorporate a substance contained in a first liquid into a second liquid efficiently in a microarea.

In addition, a second technical problem to be solved by the present invention suggests a separating method, a separating apparatus and a chip for the separating apparatus which separate a second liquid from mixed first liquid and second liquid in a microarea.

In order to solve the first technical problem, the present invention provides an extracting method which is basically characterized in that a layered first liquid and a layered second liquid come in contact with each other, and a substance in a first laminar flow of the first liquid is moved into a second laminar flow of the second liquid. More concretely, the following extracting method is provided.

The extracting method is to incorporate the substance contained in the first liquid into the second liquid so as to extract the substance. This extracting method has the first step and the second step. In the first step, the first liquid and the second liquid are transferred into a channel so as to alternately come in contact with each other respectively in not less than one or two laminar state, and the substance in the first laminar flow of the first liquid is moved to the second laminar flow of the second liquid. In the second step, the second liquid is separated from the first liquid in a lower stream side of the channel.

In the first step, the first fluid and the second fluid are allowed to flow into the channel with a very small width so as to be in the laminar state. When two or more first laminar flows and the second laminar flows exist, the first laminar flows and the second laminar flows are arranged alternately so as to come in contact with each other.

Generally the substance in the liquid diffuses voluntarily. Namely, molecules of a medium (liquid) continually collide with small matters (particles of the substance) in the medium, and the small matters move irregularly in the medium. Due to this Brownian movement, the small matters diffuse in the medium. A relative interfacial area of the liquid becomes large in the microarea (namely, a surface area becomes wider as compared with a volume), and the diffusion speed becomes abruptly high. For this reason, the particles of the substance in the first laminar flow move to the second laminar flow quickly. Namely, the particles are incorporated into the second liquid. In this case, it is preferable that the particles of the substance return with difficulty from the second laminar flow to the first laminar flow, and for example, it is preferable that the substance is easily incorporated into the second liquid easier than into the first liquid. When the substance is dioxin or the like, the first fluid can be water and the second fluid can be an organic solvent. Moreover, in order to diffuse it efficiently, it is preferable that a flow velocity of the first laminar flow is equal with a flow velocity of the second laminar flow and the flow velocities do not relatively differ.

According to the above method, the flow of the laminar flow and the particle diffusion phenomenon in the channel are used, so that the substance contained in the first liquid can be incorporated into the second liquid efficiently in the microarea.

In the first step, even if the liquids are sequentially transferred, the liquids may be stopped in the middle of the channel.

In the second step, only the second liquid is collected, so that the substance contained in the first liquid can be extracted.

Preferably at the first step, a width of one laminar flow is not more than 50 $\mu$m. When the width is not more than 50 $\mu$m, a Reynolds number becomes small, and the liquid is easily transferred in the channel in the laminar state.

The second step can collect only the second liquid in the following various forms.

Preferably, the second step includes a channel branching step. In the channel branching step, in the lower stream side of the channel, the first laminar flow is allowed to flow into a first branch channel, and the second laminar flow is allowed to flow in a second branch channel. In this case, the channels is branched for each liquid in the laminar state, so that the second liquid can be separated from the first liquid easily.

Preferably, the second step includes a charging step. In the charging step, a vicinity of an inlet of the first branch channel or the second branch channel is charged. Polarity is provided to the first liquid or the second liquid and the other liquid has no polarity by the charging step, one liquid having a polarity is activated so as to enter the charged first branch channel or second branch channel, and thus the liquids can be separated more efficiently. For example, nonpolar molecules such as petroleum ether, carbon tetrachloride, benzene, xylene, nitrobenzene and iodine can be separated from water having polarity. As for a mixed liquid composed of three or more liquids, in the case where only one liquid has polarity or where only one liquid is nonpolar, the one liquid can be separated from the other liquids.

In addition, the present invention provides the following separating method in order to solve the second technical problem.

The separating method separates a second liquid from mixed first liquid and second liquid. The separating method has the first step and the second step. In the first step, the mixed first liquid and second liquid are allowed to flow into the channel. The channel is composed of a first space and a second space. The first space is provided with a microstructure, and one of the first liquid and the second liquid flows relatively easily. The second space extends along the first space and is connected with the first space. In the second step, the second liquid is collected in a lower stream side of the first space or the second space in which the second liquid flows.

According to the above method, when the mixed first and second liquids are allowed to flow in the channel, one of the first and second liquids which flow relatively easily into the first space flows in the first space, and the other liquid flows in the second space. For example, the structures undergo a hydrophilic treatment and are provided with a suitable functional group, so that one of the first and second liquids can easily flow relatively in the first space. Since the first liquid and the second liquid separate from each other and the second liquid flows in the first space or the second space, the second liquid can be collected in the lower stream.

Therefore, the second liquid can be separated from the mixed first and second liquids in the microarea.

In the above method, the microstructure is constituted suitably, so that one of the first and second liquids can be allowed to flow relatively easily in the first space of the separated channel. For example, the microstructure contains a lot of elements, and a distance (gap) between the adjacent elements is not more than 10 $\mu$m. The microstructure may be made of a porous substance in which microholes are opened on all sides, or a fiber block.

Preferably, the structure is a column-shaped structure which extends from the first space side to the second space side.

A fluid which flows with relative difficulty in the first space of the first liquid and the second liquid can move easily along the extending direction of the microstructure towards the second space. Therefore, a separating efficiency of the liquid can be heightened.

More preferably, one of the first liquid and second liquid contains water. The above structure undergoes a water-repellent treatment. In this case, the first or second liquid containing water repels the microstructure which underwent the water-repellent treatment so as to move to the second space, so that the liquid separating efficiency can be heightened. In the case where only one liquid of a mixed liquid composed of three or more liquids has water and affinity, the one liquid can be separated from the other liquids.

Further, in order to solve the above first technical problem, the present invention provides an extracting apparatus which is basically characterized in that a first liquid space in which a first liquid is to flow in a layered state and a second liquid space in which a second liquid is to flow in a layered state are arranged so as to come in contact with each other in the layer direction. More concretely, the extracting apparatus is constituted in the following manner.

The extracting apparatus incorporates a substance contained in the first liquid into the second liquid and extract the substance. The extracting apparatus has a channel and a separating section. The first liquid and the second liquid flow in the channel with them contacting alternately in not less than one or two laminar state, and the substance in the first laminar flow of the first liquid moves to the second laminar flow of the second liquid. The separating section is connected to a lower stream side of the channel and separates the second liquid from the first liquid.

According to the above constitution, the first fluid and the second fluid are allowed to flow in a very small width of the channel so as to be capable of being in a laminar state. In the case of two or more first and second laminar flows, the first laminar flows and the second laminar flows are arranged alternately so as to come in contact with each other.

Generally, the substance in the liquid diffuses voluntarily. Namely, molecules of a medium (liquid) continually collide with small matters (particles of the substance), and the small matters move in the medium irregularly. Due to this Brownian movement, the small matters diffuse in the medium. In the microarea, the relative interfacial area of the liquid becomes large (namely, a surface area becomes larger as compared with a volume), and the diffusion speed becomes abruptly high. For this reason, the particles of the substance in the first laminar flow move to the second laminar flow quickly. Namely, the particles are incorporated into the second liquid. In this case, it is preferable that the particles of the substance return with difficulty from the second laminar flow to the first laminar flow, and for example, it is preferable that the substance is incorporated into the second liquid more easily than into the first liquid. When the substance is dioxin or the like, the first fluid can be water and the second fluid can be an organic solvent. Moreover, in order to diffuse the substance efficiently, it is preferable that the flow velocity of the first laminar flow is equal with the flow velocity of the second laminar flow and the flow velocities do not vary relatively.

According to the above constitution, the flow of the laminar flow and the diffusion phenomenon of the particles in the channel are used, so that the substance contained in the first liquid can be incorporated into the second liquid efficiently in the microarea.

In the separating section, only the second liquid is collected, so that the substance contained in the first liquid can be extracted.

Preferably, in the channel, a width of one laminar flow is not more than 50 $\mu$m. When the width is not more than 50

μm, a Reynolds number becomes small, and the liquid can be easily transferred in the laminar state in the channel.

The separating section can collect only the second liquid in the following various forms.

Preferably the separating section includes a first branch channel in which the first laminar flow flows, and a second branch channel in which the second laminar flow flows. In this case, the channel is branched for each liquid in the laminar state, so that the second liquid can be separated from the first liquid easily. More preferably, a charging section, which charges a vicinity of an inlet of the first branch channel or the second branch channel is provided.

According to the above constitution, in the case where the first liquid or the second liquid has polarity and the other one is nonpolar, one liquid having polarity is activated so as to enter the charged first branch channel or second branch channel, so that the liquid can be separated more efficiently. For example, nonpolar molecules such as petroleum ether, carbon tetrachloride, benzene, xylene, nitrobenzene and iodine can be separated from water having polarity. As for a mixed liquid composed of three or more liquids, in the case where only one liquid has polarity or where only one liquid is nonpolar, the one liquid can be separated from the other liquids.

Further, in order to solve the above second technical problem, the present invention provides a separating apparatus having the following constitution.

The separating apparatus separates the second liquid from the mixed first liquid and second liquid. The separating apparatus has a first space, a second space and a discharge port. The first space is provided with a microstructure, and one of the first liquid and the second liquid flows relatively easily. The second space extends along the first space and is connected to the first space. The discharge port is connected to a lower stream side of the first space or the second space where the second liquid flows, and the second liquid flows therein.

According to the above constitution, when the mixed first and second liquids are allowed to flow in the first space and the second space, one of the first liquid and the second liquid which flows relatively easily in the first space flows in the first space, and the other liquid flows in the second space, so that the first liquid and the second liquid are separated from each other. For example, the structures undergo a hydrophilic treatment or a suitable functional group is provided, so that one of the first liquid and the second liquid can be allowed to flow in the first space relatively easily. Since the second liquid flows in one of the first space or the second space, the second liquid can be collected from the discharge port. Therefore, the second liquid can be separated from the mixed first liquid and the second liquid in the microarea.

In the above constitution, the microstructure is suitably constituted, so that one of the first liquid and the second liquid can be allowed to flow in the first space of the separated channel relatively easily. For example, the microstructure includes a lot of elements, and a distance (gap) between the adjacent elements is not more than 10 μm. The microstructure may be composed of a porous substance in which microholes are opened on all sides, or a fiber block.

Preferably, the structure is a column-shaped structure which extends from the first space side to the second space side.

A fluid which flows with relative difficulty in the first space of the first liquid and the second liquid can move easily along the extending direction of the microstructure towards the second space. Therefore, a separating efficiency of the liquid can be heightened.

More preferably, one of the first liquid and second liquid contains water. The above structure undergoes a water-repellent treatment.

According to the above constitution, the first or second liquid containing water repels the microstructure which has undergone the water-repellent treatment so as to move to the second space, so that the liquid separating efficiency can be heightened. In the case where only one liquid of a mixed liquid composed of three or more liquids has water and affinity, the one liquid can be separated from the other liquids.

Further, in order to solve the above first technical problem, the present invention provides a chip for the extracting apparatus having the following constitution.

The chip to be used for the extracting apparatus is used for the extracting apparatus which incorporates the substance contained in the first liquid into the second liquid so as to extracts the substance. The chip has a channel. The first liquid and the second liquid are transferred in the channel so as to come in contact with each other alternately in not less than one or two laminar state, and the substance in the first laminar flow of the first liquid can be moved into the second laminar flow of the second liquid.

In the above constitution, the first fluid and the second fluid are allowed to flow in a very small width of the channel so as to be capable of being in the laminar state. In the case of two or more first laminar flows and second laminar flows, the first laminar flows and the second laminar flows are arranged alternately so as to be capable of being in contact with each other.

Generally, the substance in the liquid diffuses voluntarily. Namely, molecules of a medium (liquid) continually collide with small matters (particles of the substance) in the medium, and the small matters move in the medium irregularly. Due to this Brownian movement, the small matters diffuse in the medium. In the microarea, the relative interfacial area of the liquid becomes large (namely, a surface area becomes larger as compared with a volume), and the diffusion speed becomes abruptly high. For this reason, the particles of the substance in the first laminar flow move to the second laminar flow quickly. Namely, the particles are incorporated into the second liquid. In this case, it is preferable that the particles of the substance return with difficulty from the second laminar flow to the first laminar flow, and for example, it is preferable that the substance is incorporated into the second liquid more easily than into the first liquid. When the substance is dioxin or the like, the first fluid can be water and the second fluid can be an organic solvent. Moreover, in order to diffuse the substance efficiently, it is preferable that the flow velocity of the first laminar flow is equal with the flow velocity of the second laminar flow and the flow velocities do not vary relatively.

According to the above constitution, the flow of the laminar flows and the diffusion phenomenon of the particles in the channel are used, so that the substance contained in the first liquid can be incorporated into the second liquid efficiently in the microarea.

Only the second liquid is collected, so that the substance contained in the first liquid can be extracted.

Preferably, in the channel, a width of one laminar flow is not more than 50 μm. When the width is not more than 50 μm, a Reynolds number becomes small, and the liquid can be easily transferred in the laminar state in the channel.

Preferably, a first branch channel and a second branch channel are provided. The first branch channel is connected to a lower stream side of the channel, and the first laminar flow flows therein. The second branch channel is connected to a lower stream side of the channel, and the second laminar flow flows therein. According to the above constitution, the channel is branched for each liquid in the laminar state, so that the second liquid can be separated from the first liquid easily. More preferably, a charging section, which charges a vicinity of an inlet of the first branch channel or the second branch channel is provided.

According to the above constitution, in the case where the first liquid or the second liquid has polarity and the other one is nonpolar, one liquid having polarity is activated so as to enter the charged first branch channel or second branch channel, so that the liquid can be separated more efficiently. For example, nonpolar particles such as petroleum ether, carbon tetrachloride, benzene, xylene, nitrobenzene and iodine can be separated from water having polarity. As for a mixed liquid composed of three or more liquids, in the case where only one liquid has polarity or where only one liquid is nonpolar, the one liquid can be separated from the other liquids.

Further, in order to solve the second technical problem, the present invention provides a chip for the separating apparatus having the following constitution.

The chip for the separating apparatus is used for the separating apparatus which separates a second liquid from mixed first liquid and second liquid. The chip has a first space, a second space and a discharge port. The first space is provided with a microstructure, and one of the first liquid and the second liquid flows relatively easily. The second space extends along the first space and is connected to the first space. The discharge port is connected to a lower stream side of the first space or the second space where the second liquid flows, and the second liquid flows therein.

According to the above constitution, when the mixed first and second liquids are allowed to flow in the channel, one of the first liquid and the second liquid which flows relatively easily in the first space flows in the first space, and the other liquid flows in the second space. For example, the structure undergoes a hydrophilic treatment or a suitable functional group is provided, so that one of the first liquid and the second liquid can be allowed to flow in the first space relatively easily. Since the first liquid and the second liquid are separated from each other and the second liquid flows in one of the first space and the second space, the second liquid can be collected on the lower stream side.

Therefore, the second liquid can be separated from the mixed first liquid and the second liquid in the microarea.

The microstructure is suitably constituted, so that one of the first liquid and the second liquid can be allowed to flow in the first space relatively easily. For example, the microstructure includes a lot of elements, and a distance (gap) between the adjacent elements is not more than 10 $\mu$m. The microstructure may be composed of a porous substance in which microholes are opened on all sides, or a fiber block.

Preferably, the structure is a column-shaped structure which extends from the first space side to the second space side.

According to the above constitution, a fluid which flows with relative difficulty in the first space of the first liquid and the second liquid can move easily along the extending direction of the microstructure towards the second space. Therefore, a separating efficiency of the liquids can be heightened.

More preferably, one of the first liquid and second liquid contains water. The above structure undergoes a water-repellent treatment.

According to the above constitution, the first or second liquid containing water repels the microstructure which has undergone the water-repellent treatment so as to move to the second space, so that the liquid separating efficiency can be heightened. In the case where only one liquid of a mixed liquid composed of three or more liquids has water and affinity, the one liquid can be separated from the other liquids.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENTS

There will be explained below embodiments of the present invention with reference to FIGS. 1 to 10.

First of all, a first embodiment of the present invention will be explained with reference to FIGS. 1 to 6 and FIG. 10.

Figure 1:
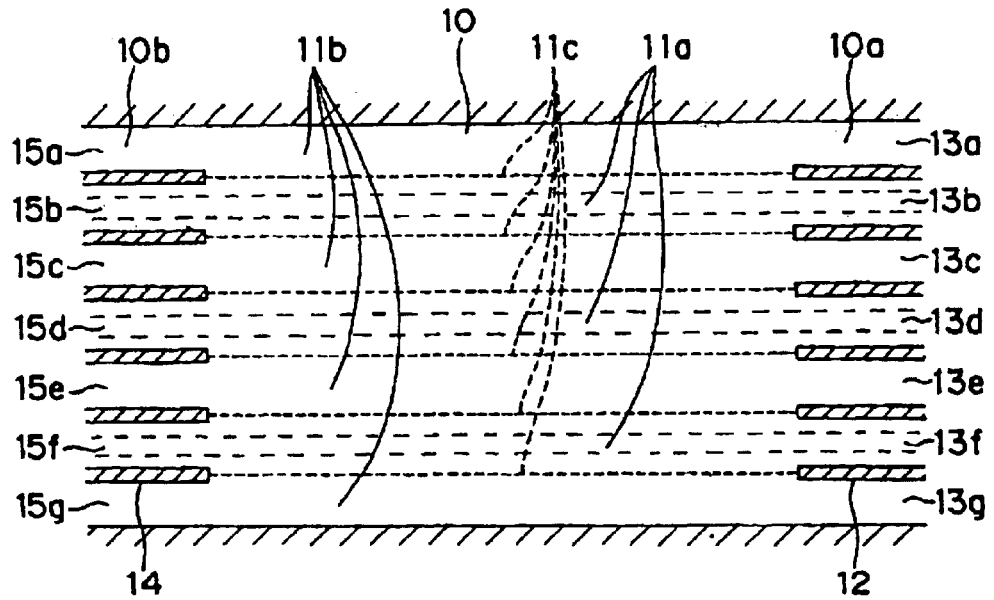
FIG. 1 is a schematic diagram showing a flow of a microarea.

FIG. 1 typically shows a flow of water and solvent in a microarea. Divided channels 10a and 10b, which are divided respectively into plural channels 13a to 13g and 15a to 15g by partition walls 12 and 14, are formed on both ends of one center channel 10 without a partition so as to be opposed to each other. The solvent and the water flow alternately in one divided channel 10a. For example, the solvent flows in the channels 13a, 13c, 13e and 13g and the water flows in the channels 13b, 13d and 13f. A width of the respective channels 13a to 13g is, for example, 20 $\mu$m, and since a Reynolds number becomes small in such a microarea, the water and the solvent outflow from the divided channel 10a become laminar flows 11a and 11b respectively in the center channel 10, and if they are adjacent to each other, they flow without mixing, and interfaces 11c are formed respectively between the water and the solvents. The laminar flows 11a and 11b flow into the channels 15a to 15g of the other divided channel 10b. Namely, the solvent flows into the channels 15a, 15c, 15e and 15g, and the water flows into the channels 15b, 15d and 15f.

Figure 2:
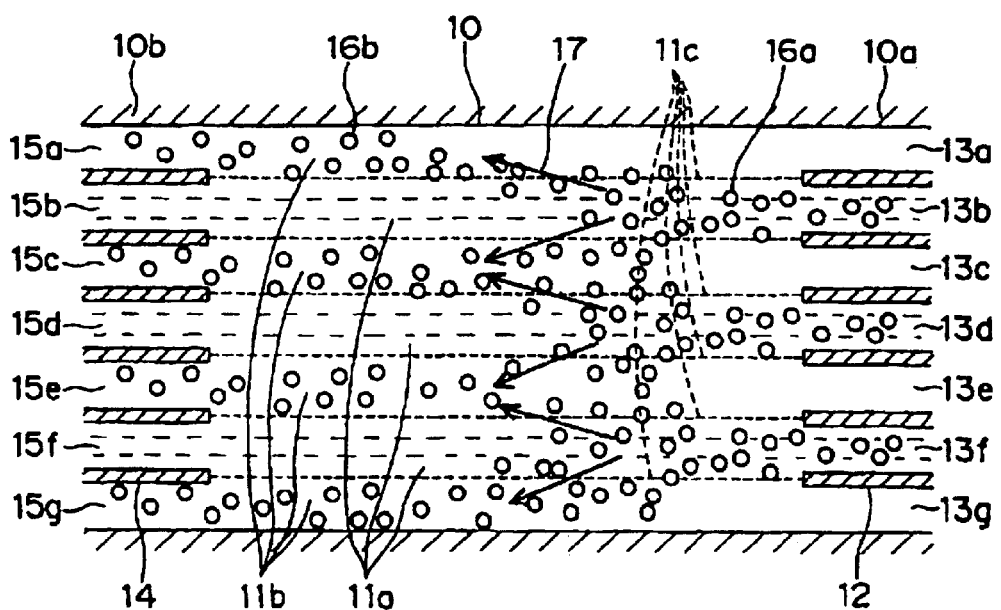
FIG. 2 is a schematic diagram showing movement of particles in the microarea.

FIG. 2 typically shows movement of particles 16a and 16b of dioxin or the like in the liquid. In the divided channel 10a, the particles 16a are contained only in the water which flows in the channels 13b, 13d and 13f but are not contained in the solvent which flows in the channels 13a, 13c, 13e and 13g. Just after outflowing to the center channel 10, the particles 16a are contained in water layers 11a. The particles 16a voluntarily diffuse in the liquid due to Brownian movement. At this time, as shown by arrows 17, the particles 16b which exceed interfaces 11c and moves from the water layers 10d to solvent layers 10b hardly returns to the water layers 10d due to a difference of solubility. Since a relative interfacial area of the liquid becomes large in the microarea and a diffusion speed abruptly becomes high, the particles 16a in the water layers ha move to the solvent layers 11b quickly. Therefore, if only the solvent layers 11b are collected by using the divided channel 10b, the particles 16b can be extracted.

Figure 3:
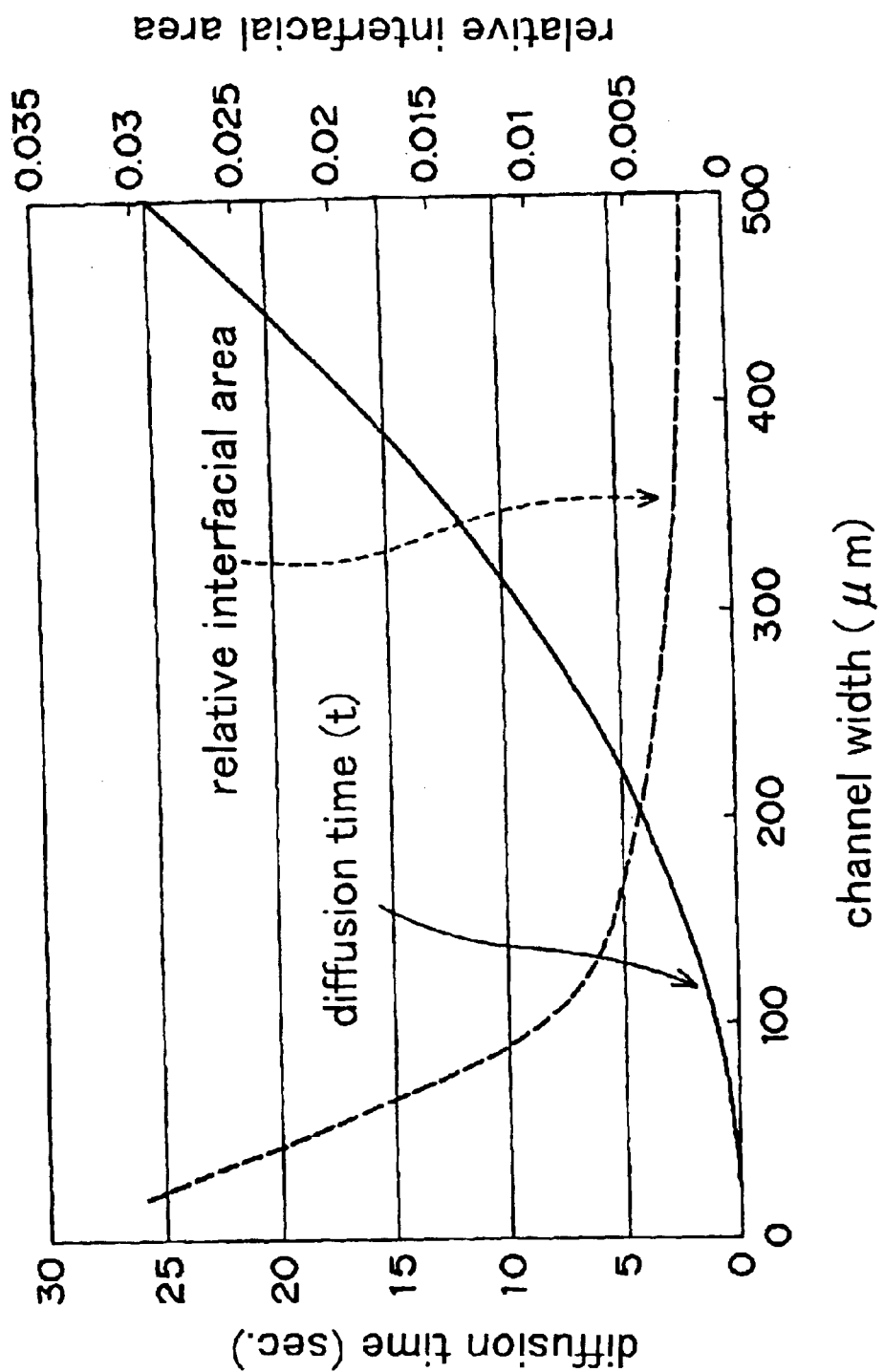
FIG. 3 is a graph showing a relationship among a channel width, a relative interfacial area and a diffusion speed.
Figure 4:
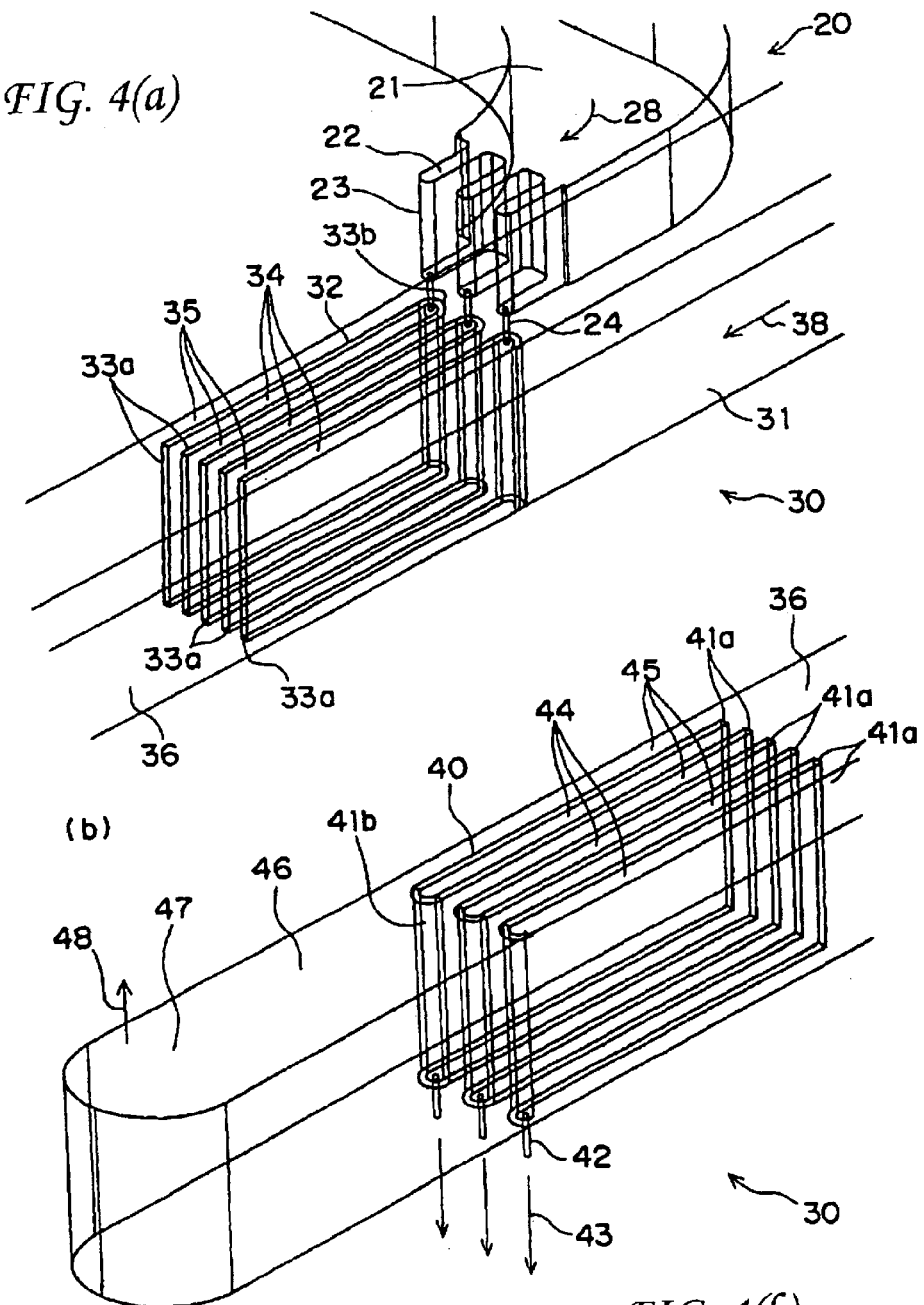
FIGS. 4a and 4b are a main section perspective view 5a of a pretreatment assembly according to a first embodiment of the present invention.

FIG. 3 is one example of a graph of the channel width, the relative interfacial area S/V and the diffusion time t. When the channel width becomes smaller than 50 μm, the diffusion time t abruptly becomes short and the diffusion speed becomes high. Therefore, when the channel width is not more than 50 μm, preferably not more than 20 μm, the mixing and extracting time can be shortened greatly. For example, this embodiment can be used in a blood clotting test which requires that a reagent should be mixed fast (within 1 second).

FIGS. 4a to 6 show an embodiment in which the present invention is applied to a pretreatment assembly 50 for measuring dioxin.

As shown in FIG. 4(a), in order to allow a condensed dioxin solution and an organic solvent to flow into a layer form, channels 20 and 30 which cross three dimensionally are formed.

The organic solvent flows in the channel 20 arranged in an upper section to a direction shown by an arrow 28. As for the channel 20, one main channel 21 branches into three branch channels 22 on a lower stream side, and drum-shaped down channels 24 are formed to face downward respectively from bottom faces of end sections 23 of the branch channels 22.

The condensed dioxin solution flows in an upper stream channel 31 of the channel 30 arranged in a lower section to a direction shown by an arrow 38. Divided channels 32 are formed in the middle way of the channel 30, and the organic solvent and the dioxin solution respectively flow in channels 34 and 35 which are formed alternately. Namely, plural pairs of partition walls 33a are arranged with an interval. The respective paired partition walls 33a extend to the channel direction and have a thickness of a several μm. Upper stream sides of the paired partition walls 33a are combined by connecting walls 33b. The organic solvent flows from the down channels 24 to the channels 34 between the paired partition walls 33a, and the condensed dioxin solution flows from the upper stream channel 31 to the channels 35 between the paired adjacent partition walls 33a.

One laminar flow mixing channel 36 is formed on the lower stream side of the divided channels 32, and the dioxin solution and the organic solvent flow in the laminar state in the laminar flow mixing channel 36 so that the dioxin dissolves in and is incorporated into the organic solvent layer. A width of the laminar flow mixing channel 36 is about 200 μm, and its height (up-and-down direction in the diagram) is about 100 μm.

Meanwhile, as shown in FIG. 4(b), divided channels 40 are formed on the lower stream side of the laminar flow mixing channel 36 so as to be opposite to the divided channels 32, and the water and the organic solvent respectively flow in channels 45 and 44 formed alternately.

Namely, plural pairs of partition walls 41a are arranged with an interval. The respective paired partition walls 41 a extend to the channel direction, and their lower stream sides are combined by connecting walls 41b. The organic solvent containing dioxin flows into the channels 44 between the paired partition walls 41a, and the water from which the dioxin is removed flows in the channels 45 between the paired adjacent partition walls 41a.

Discharge channels 42 are formed on the lower stream side of the paired partition walls 41a, and as shown by arrows 43, the organic solvent containing the dioxin is sucked downward and treated at the next step.

Meanwhile, after the water from which the dioxin is removed passes through the divided channel 40, it flows in a channel 46 and, as shown by an arrow 48, is sucked upward from an end section 47 of the channel.

Figure 5:
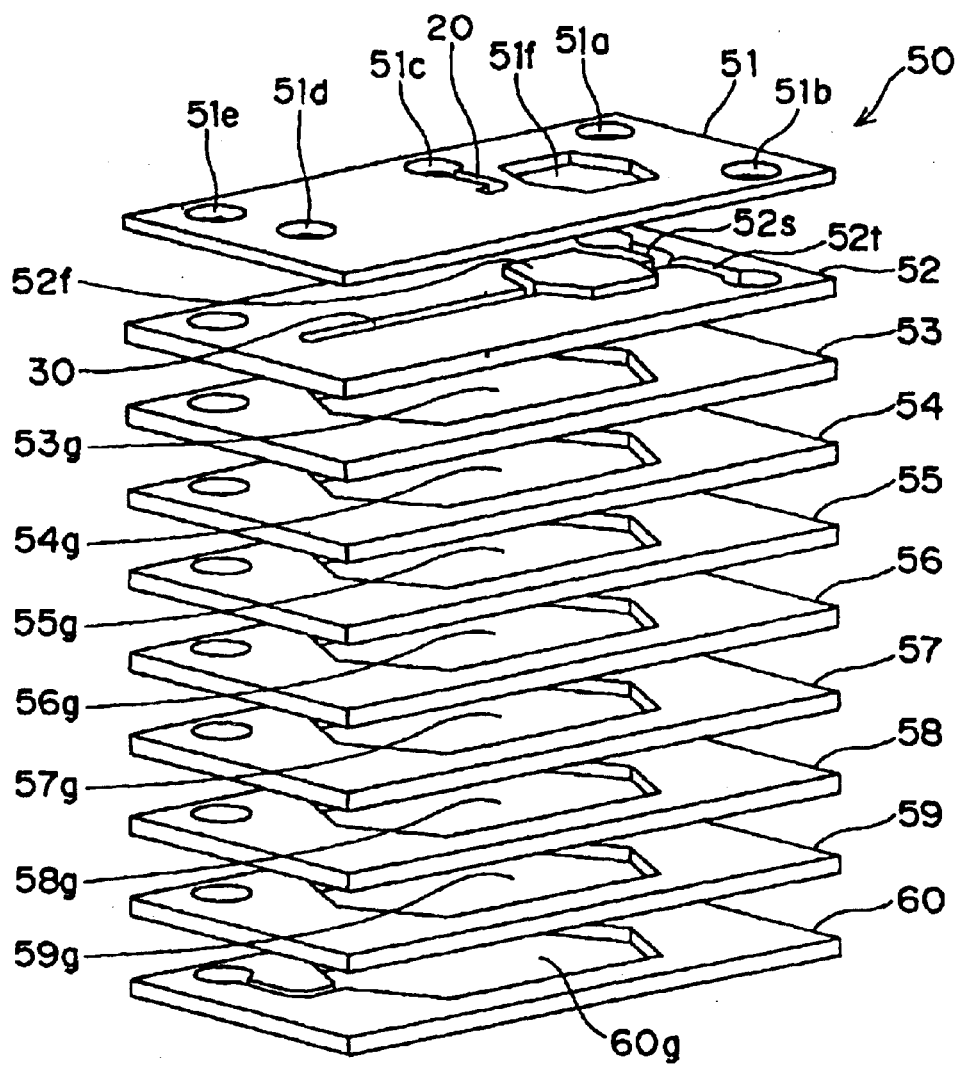
FIG. 5 is an exploded perspective view of the pretreatment assembly.

The channels 20 and 30 are formed in the pretreatment assembly 50 in a manner that a plurality of chips 51 to 60, shown in FIG. 5, are laminated. In this specification, the pretreatment assembly 50 may be mentioned as a chip.

The respective chips 51 to 60 can be created accurately, for example, by dry-etching silicon or glass using ICP (Inductively Coupled Plasma). Direct coupling is used for silicon-to-silicon coupling, and anode coupling is used for silicon-to-glass coupling, but the bonding may be carried out by epoxy adhesive. Moreover, a mold of the chip is formed by galvanoplasty using silicon or nickel, and a resin such as PMMA (polymethyl methacrylate) or PDMS (polydimethyl siloxane) is molded so that a lot of chips can be created at a low rate. In this case, it is necessary to coat the resin so that the resin does not react with the organic solvent. Moreover, not only the dry etching but also wet etching may be used as the etching of silicon and glass.

The first layer chip 51 is formed with an inlet 51a for supplying an exhaust gas sample containing dioxin or the like, an inlet 51b for supplying the water, an inlet 51c and a channel 20 for supplying the organic solvent, a through hole 51f, a discharge port 51d for discharging unnecessary water and a discharge port 51e for discharging refined dioxin.

The second layer chip 52 is formed with channels 52s and 52t in which the exhaust gas sample and the water supplied from the inlet 51a and 51b flow and interflow, a porous glass 52f for collecting and condensing dioxin, and the channel 30 in which the collected and condensed dioxin solution flows.

The third layer to tenth layer chips 53 to 60 are provided with a suitable reagent based on, for instance, Japanese Industrial Standards (JIS) in order to refine the dioxin using multi-layer silica chromatography. Namely, pursuant to the JIS, 53 g of sodium sulfate is contained in the third layer chip 53, 54 g of 10% by weight silver nitrate is contained in the fourth layer chip 54, 55 g of silica gel is contained in the fifth layer chip 55, 56 g of 22% by weight silica gel sulfate is contained in the sixth layer chip 56, 57 g of 44% by weight silica gel sulfate is contained in the seventh layer chip 57, 58 g of silica gel is contained in the eighth layer chip 58, 59 g of 2% by weight silica gel potassium hydroxide is contained in the ninth layer chip 59, and 60 g of silica gel is contained in the tenth layer chip 60. Of course, the reagents may be altered in accordance with the other standards. chip 55, 56 g of 22 weight % silica gel sulfate is contained in the sixth layer chip 56, 57 g of 44% by weight silica gel sulfate is contained in the seventh layer chip 57, 58 g of silica gel is contained in the eighth layer chip 58, 59 g of 2% by weight silica gel potassium hydroxide is contained in the ninth layer chip 59, and 60 g of silica gel is contained in the tenth layer chip 60. Of course, the reagents may be altered in accordance with the other standards.

Figure 6:
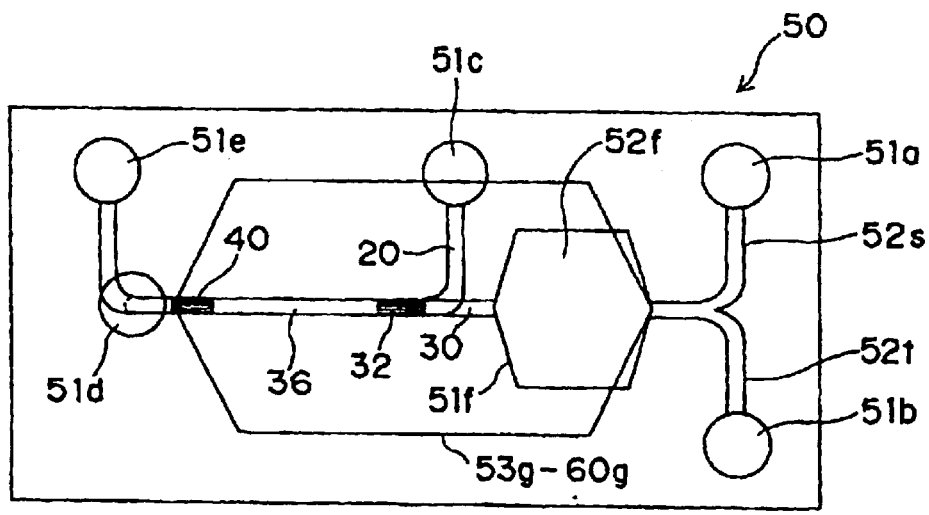
FIG. 6 is a top view of the pretreatment assembly.
Figure 10:
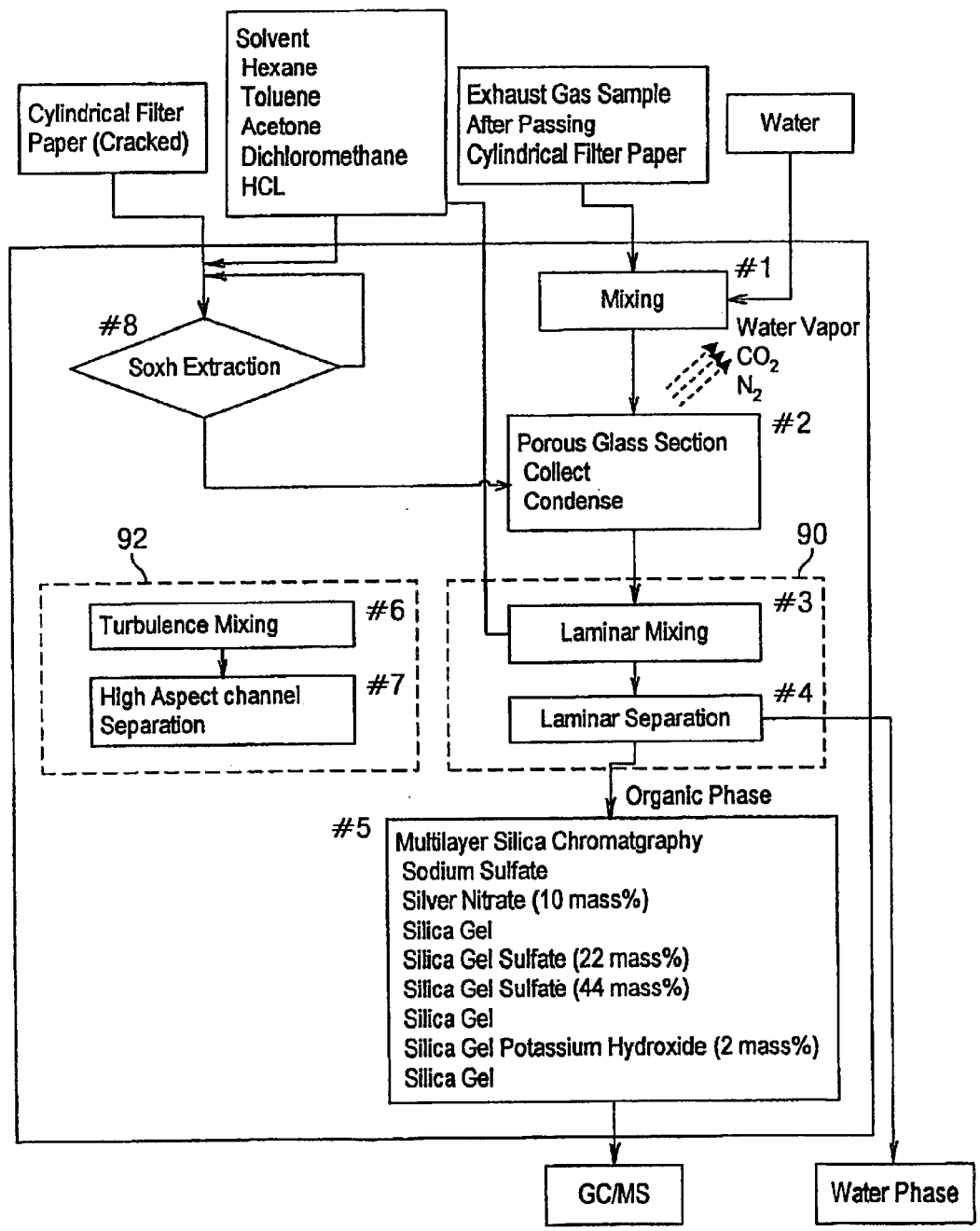
FIG. 10 is a flowchart of the pretreatment step in a dioxin measurement.

As shown in FIGS. 6 and 10, the exhaust gas sample and the water which have passed cylindrical filter paper are supplied to the inlets 51a and 51b of the pretreatment assembly 50 and pass through the channels 52s and 52t so as to be mixed (#1). The cylindrical filter paper is broken and the dioxin may be collected (#8) by soxhlet extraction using a solvent instead of water.

The mixed solution of the dioxin and water passes through the porous glass 52f, so that the dioxin is collected and condensed (#2). Namely, water vapor, carbon dioxide and nitrogen dioxide pass from the porous glass 52f through the through hole 51f of the chip 51 so as to be discharged.

The water which contains the condensed dioxin or the like flows in the channel 30. The organic solvent is supplied from the inlet 51c so as to flow in the channel 20. The organic solvent contains hexane, toluene, acetone, dichloromethane and HCL in at the suitable rate. The water containing the dioxin or the like and the organic solvent pass through the divided channel 32 so as to meet in the laminar flow mixing section 36, and as mentioned above, the dioxin or the like is incorporated into the organic solvent (#3 in FIG. 10), so that the water and the organic solvent are separated in the divided channel 40 (#4 in FIG. 10).

The unnecessary water is discharged from the upper discharge port 51d.

The organic solvent flows in the lower section and passes sequentially through the chips 53 to 60 provided with 53g to 60g of reagents and slightly mixed water is removed so that the dioxin is refined (#5 in FIG. 10). The refined dioxin is discharged from the upper outlet 51e and is measured by GC/MS (gas chromatography/mass spectrograph).

A second embodiment of the present invention will be explained below with reference to FIGS. 7, 8 and 10.

In the second embodiment, as shown by a reference numeral 90 in FIG. 10, instead that after the water and the organic solvent are mixed by the laminar flow, they are separated (#3 and #4), as shown by a reference numeral 92, turbulence occurs so that the water and the organic solvent are mixed and thereafter separated (#6 and #7).

Figure 7:
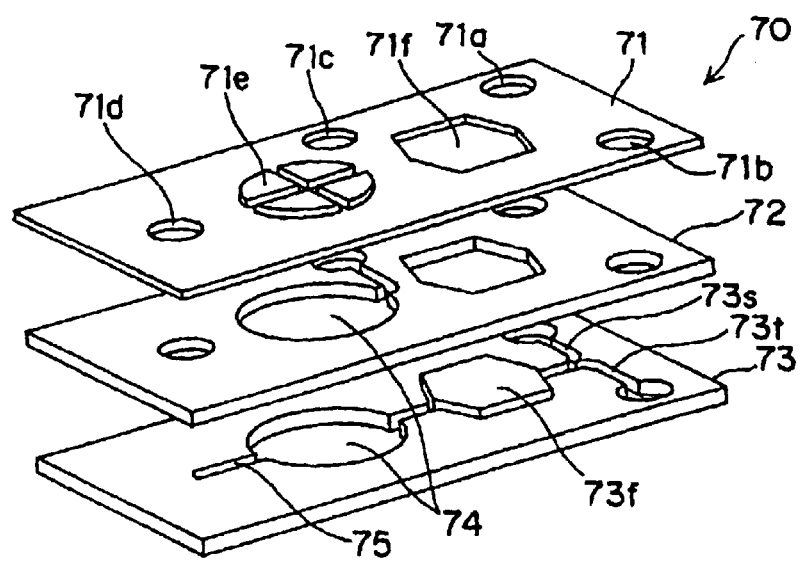
FIG. 7 is a main section exploded perspective view of the pretreatment assembly according to a second embodiment of the present invention.

The pretreatment assembly 70 to which the present invention is applied uses chips 71, 72 and 73 shown in FIG. 7 instead of the chips 51 and 52 shown in FIG. 5. The chips 71, 72 and 73 can be processed by the similar method to the chips 51 and 52.

Similarly to the chip 51 of the first embodiment, the first layer chip 71 is formed with an inlet 71a for supplying an exhaust gas sample, an inlet 71b for supplying water, an inlet 71c for supplying an organic solvent, a through hole 71f and a discharge port 71d for discharging unnecessary water.

Similarly to the chip 52 of the first embodiment, the third layer chip 73 is provided with channels 73s and 73t in which the exhaust gas sample and the water flow and interflow, and a porous glass 73f for collecting and condensing the dioxin.

Differently from the first embodiment, mixing spaces 74 for mixing the water containing the dioxin or the like and the organic solvent using turbulence are formed respectively between the first to third layer chips 71 to 73. Moreover, a PZT layer 71e is formed in an area opposed to the mixing spaces 74 on the upper surface of the first layer chip 71. The PZT layer 71e is divided into four sections, for example, and a voltage of suitable waveform is applied to the respective sections in a suitable order so that an ultrasonic is generated. As a result, eddy is generated in the mixing spaces 74, so that the water containing the dioxin or the like and the organic solvent can be agitated and mixed.

The mixed water and organic solvent passes from the mixing spaces 74 through a channel 75 formed on the third layer chip 73, so that the water and the organic solvent are separated.

Figure 8:
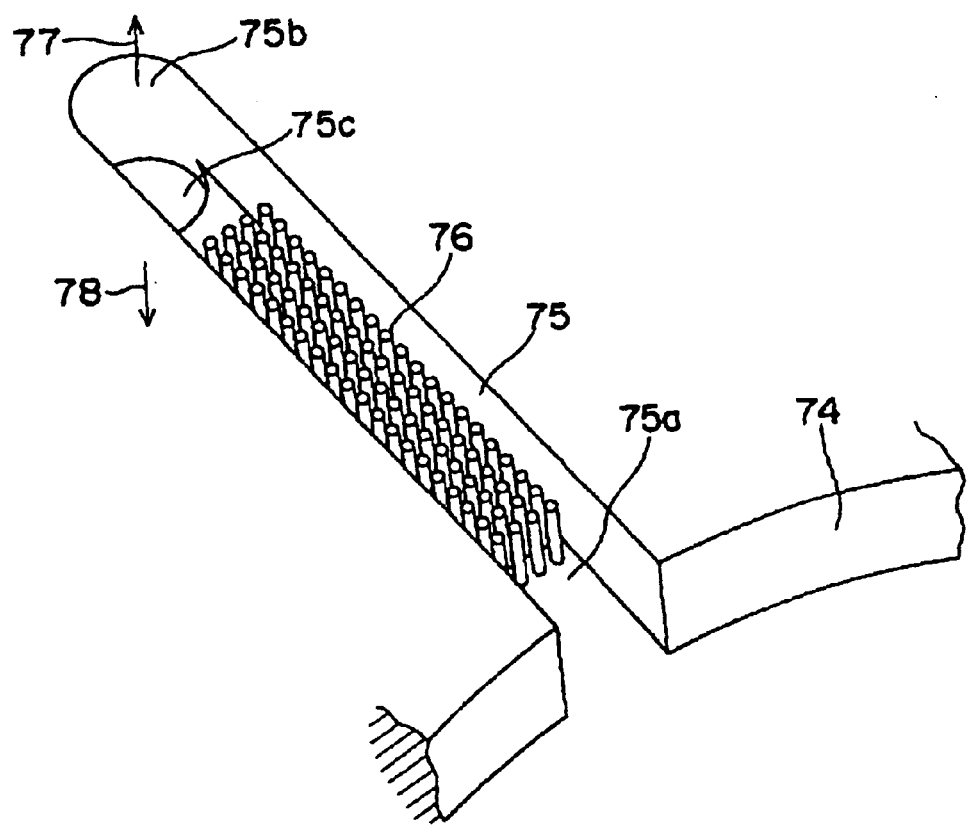
FIG. 8 is a main section enlarged perspective diagram of the pretreatment assembly.

As shown in FIG. 8, microstructure 76 is formed in the lower section of the channel 75 (namely, a first space). The microstructure 76 has a plurality of columns having a diameter of several $\mu$m to several dozen $\mu$m, and they extend from a bottom section 75a of the channel 75 to the middle of the height direction of the channel 75, and there is no obstruction in the upper section of the channel 75 (namely, a second space). A distance (gap) between the columns is, for example, not more than 10 $\mu$m. The microstructure 76 are not limited to in the form of the columns, and may be, for example, prisms or cones. Furthermore, the microstructure 76 may be made of a porous substance or a fiber block.

The surfaces of the microstructures 76 undergo a water-repellent treatment. In the case where the microstructures 76 are formed by an ICP apparatus, since the working process uses $C_4F_8$ gas, their surfaces undergo water-repellent process without special additional treatment. The surfaces may undergo the water-repellent treatment by adhering fluorine macromolecules to the surfaces by eutectoid plating or the like.

The water of the mixed solution which has entered the microstructures 76 moves to the upper section of the channel 75 due to the water-repellent treatment of the microstructures 76. Meanwhile, the organic solvent just flows in the lower section of the channel 75. Moreover, the water and the organic solvent are separated to the upper section and the lower section of the channel 75 with the assistance of a difference in specific gravity. The microstructures 76 may be formed in the upper section of the channel 75 according to a difference in specific gravity.

Thereafter, unnecessary water is sucked from a lower stream end section 75b of the channel 75 to the upper section as shown by an arrow 77. Meanwhile, the organic solvent is sucked from a discharge port 75c formed on the bottom face of the lower stream end section 75b to the lower section as shown by an arrow 78 so as to flow into a refining section, not shown, (for example, it is composed similarly to the chips 53 to 60).

As explained above, the flow of the laminar flow and the diffusion phenomenon of particles in the microarea are used, so that the dioxin can be extracted efficiently using a very small amount of a sample. Moreover, a second liquid can be separated from mixed first liquid and second liquid in the microarea.

Therefore, since the treatment can be carried out in the microchips having a size of several cm×several cm, portableness is excellent, and the treatment can be executed immediately anywhere, so that the immediacy of the check is improved. Moreover, the reacting time is fast and the treatment time is shortened, so that the cost can be reduced greatly. Further, since an amount of the organic solvent to be used for the extraction is greatly smaller than conventional methods, the method of the present invention is environmental friendly. Since the chip can be mass produced by utilizing a semiconductor process or the like, the unit price is very low. Since the unit price of the chip is low, the chip can be disposable. When the chip is disposable, unlike in the case where the chip is used plural times, the problem of pollution due to waste water does not arise and troublesome cleaning is not required.

The present invention is not limited to the above embodiments, and the invention can be carried out in another various forms.

Figure 9A:
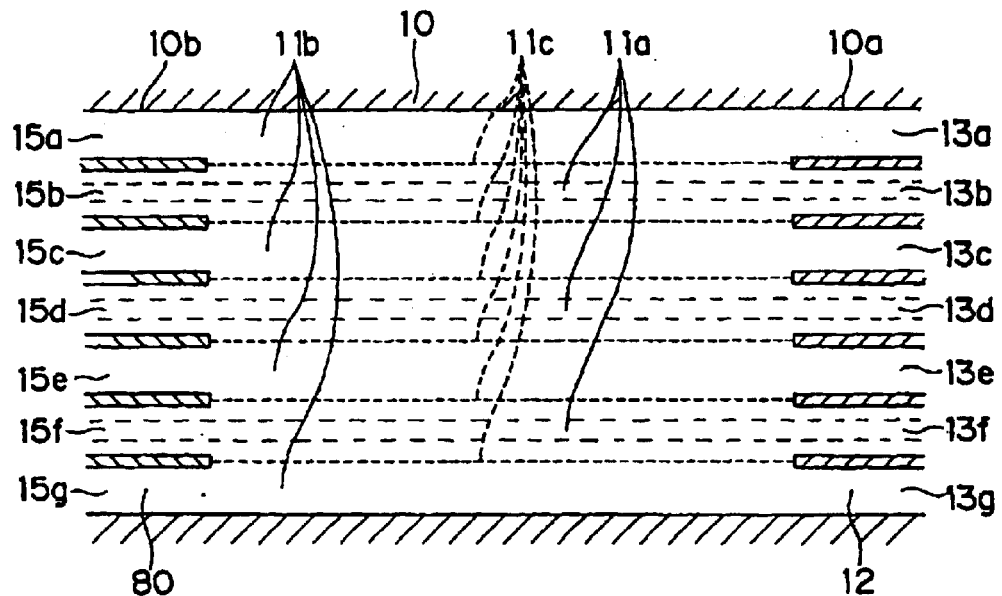
FIGS. 9a and 9b are a structural diagram 5 of divided channels according to a modified example.
Figure 9B:
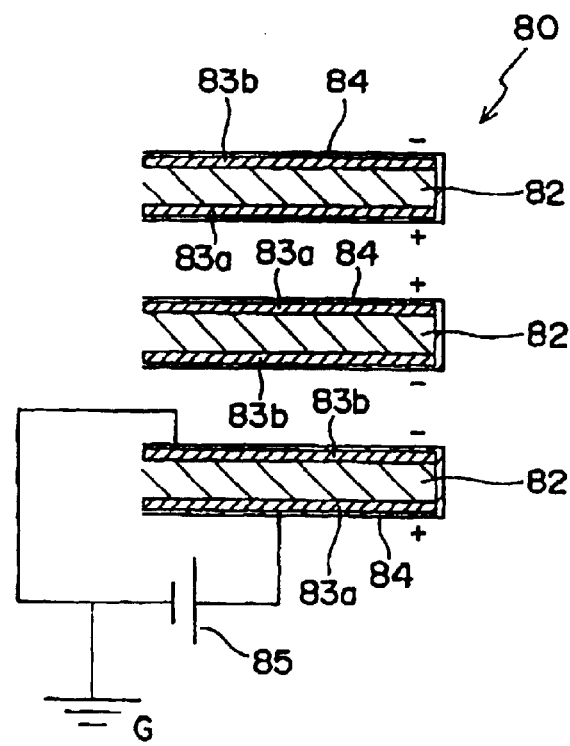

For example as shown in FIGS. 9(a) and 9(b), a partition wall 80 of the divided channel 10b is charged positively or negatively, so that the water and the organic solvent can be separated. As for the partition wall 80, main body sections 82 are formed by an insulating substance, and electrodes 83a and 83b are provided on side faces of the main body sections 82 opposed to the channels 15a to 15g, so that outermost layers 84 are covered with the insulating substance. For example, $SiO_2$ or the like is deposited as an insulating film on the surfaces of the electrodes 83a and 83b. The electrodes 83a and 83b are connected with a power source 85 so as to be charged positively or negatively. At this time, as shown in the diagram, the electrodes 83a and 83b which are countered to each other via the channels 15a to 15g have the same potential, so that the channels 15a to 15g are charged positively or negatively in an alternate manner.

Since water is polar molecule and is always charged positively, it does not enter an area charged positively. In order that the water is easily influenced by electric charge, the width of the channels 15a to 15g is not more than 50 μm. Not more than 10 μm is preferable.

Further, the present invention can be applied not only to the pretreatment for the measurement of dioxin but also to a wide range. If the present invention is applied, in the case where an organic substance which dissolves or flows in water is extracted, a slight amount of a sample solution and an extracting solvent are mixed and the extracting solvent containing the organic substance can be selectively extracted.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An extracting method for incorporating a substance contained in a first liquid into a second liquid, said method comprising the steps of:
   (a) providing a chip which contains a center channel and parallel channel;
   (b) providing the first liquid and the second liquid in respective parallel channels divided by partition walls;
   (c) transferring the first liquid and the second liquid in the center channel so that the first liquid and the second liquid alternately come in contact with each other respectively in three or more laminar flows, and the substance in a first laminar flow of the first liquid is moved to a second laminar flow of the second liquid; and
   (d) separating the second liquid from the first liquid in a lower stream side of the center channel.

2. The extracting method according to claim 1, wherein, in the step (c), the substance in the liquid diffuses voluntarily.

3. The extracting method according to claim 1, wherein the substance is dioxin, and wherein the first liquid and second liquid are water and an organic solvent, respectively.

4. The extracting method according to claim 1, wherein a flow velocity of the first laminar flow is equal to a flow velocity of the second laminar flow.

5. The extracting method according to claim 1, wherein, in the step (c), the first liquid and the second liquid are stopped in a middle of the channel.

6. The extracting method according to claim 1, wherein a width of each laminar flow is not more than 50 μm.

7. The extracting method according to claim 1, wherein the step (d) includes the step of:
   (d-1) branching, in the lower stream side of the channel, the first laminar flow and the second laminar flow into a first branch channel and a second branch channel, respectively.

8. The extracting method according to claim 7, wherein the step (d) further includes the step of:
   (d-2) charging a vicinity of an inlet of the first branch channel or the second branch channel.

9. A separating method for separating a second liquid from a mixture of a first liquid and the second liquid, said separating method comprising the steps of:
   (a) providing a chip which contains a channel;
   (b) allowing the mixture to flow into the channel that is comprised of a first space and a second space, wherein the first space is provided with a microstructure so that one of the first liquid and the second liquid flows relatively easily therethrough, and wherein the second space extends along the first space and is connected with the first space; and
   (c) collecting the second liquid in a lower stream side of the first space or the second space in which the second liquid flows.

10. The separating method according to claim 9, wherein the microstructure has undergone one of a hydrophilic treatment and a water-repellent treatment.

11. The separating method according to claim 9, wherein the microstructure is provided with a functional group.

12. The separating method according to claim 9, wherein the microstructure comprises a plurality of elements.

13. The separating method according to claim 12, wherein a distance between the adjacent elements is not more than 10 μm.

14. The separating method according to claim 12, wherein each of the element has a column-shape.

15. The separating method according to claim 9, wherein the microstructure is made of one of a porous substance and a fiber block.

16. An extracting structure for incorporating a substance contained in a first liquid into a second liquid, said extracting structure comprising a chip containing:
   a center channel having means for allowing the first liquid and the second liquid to flow therein in a form of three or more laminar flows and in which at least one first laminar flow of the first liquid and at least one second laminar flow of the second liquid alternately come in contact with each other, wherein the substance in the first laminar flow of the first liquid moves to the second laminar flow of the second liquid through at least one boundary between the at least one first laminar flow and the at least one second laminar flow;
   a plurality of parallel channels in which the first liquid and the second liquid respectively flow, said parallel channels divided by partition walls and connected to the center channel; and
   a separating section, connected to a lower stream side of the center channel, for separating the second liquid from the first liquid.

17. The extracting structure according to claim 16, wherein the substance is dioxin, and wherein the first liquid and the second liquid are water and an organic solvent, respectively.

18. The extracting structure according to claim 16, wherein a width of each of the at least one first laminar flow and the at least one second laminar flow is not more than 50 μm.

19. The extracting structure according to claim 16, wherein the separating section includes a first branch channel in which the first laminar flow flows, and a second branch channel in which the second laminar flow flows.

20. The extracting structure according to claim 19, wherein the separating section further includes an electrode for charging a vicinity of an inlet of the first branch channel or the second branch channel.

21. An extracting apparatus comprising the extracting structure according to claim 16.

22. An extracting apparatus according to claim 21, wherein a flow velocity of the at least one first laminar flow is equal to a flow velocity of the at least one second laminar flow.

23. An extracting apparatus according to claim 21, wherein the separating section comprises an electrode for charging a vicinity of an inlet of the first branch channel or the second branch channel, and wherein said extracting apparatus further comprises an power source for applying a voltage to the electrode.

24. A chip comprising the extracting structure according to claim 16.

25. A separating structure for separating a second liquid from a mixture of a first liquid and the second liquid, said separating structure comprising a chip containing:
 a first space provided with a microstructure through which one of the first liquid and the second liquid flows relatively easily therethrough relative to the other liquid;
 a second space extending along the first space and being connected to the first space; and
 a discharge port, connected to a lower stream side of one of the first space and the second space where the second liquid flows, for collecting the second liquid therein.

26. The separating structure according to claim 25, wherein the microstructure has undergone one of a hydrophilic treatment and a water-repellent treatment.

27. The separating structure according to claim 25, wherein the microstructure is provided with a functional group.

28. The separating structure according to claim 25, wherein the microstructure comprises a plurality of elements.

29. The separating structure according to claim 28, wherein a distance between the adjacent elements is not more than 10 μm.

30. The separating structure according to claim 28, wherein each of the elements has a column-shape.

31. The separating structure according to claim 25, wherein the microstructure is made of one of a porous substance and a fiber block.

32. A separating apparatus comprising the separating structure according to claim 25.

33. A chip comprising the separating structure according to claim 25.

34. An extracting method for incorporating a substance contained in a first liquid into a second liquid, said method comprising the steps of:
 (a) providing a chip which contains a center channel and parallel channels;
 (b) providing the first liquid and the second liquid in respective parallel channels divided by partition walls;
 (c) transferring the first liquid and the second liquid in a center channel so that the first liquid and the second liquid alternately come in contact with each other respectively in two or more laminar flows, and the substance in a first laminar flow of the first liquid is moved to a second laminar flow of the second liquid; and
 (d) separating the second liquid from the first liquid in a lower stream side of the channel.

35. An extracting structure for incorporating a substance in a first liquid into a second liquid, said extracting structure comprising a chip containing:
 a center channel having means for allowing the first liquid and the second liquid to flow therein in a form of two or more laminar flows and in which at least one first laminar flow of the first liquid and at least one second laminar flow of the second liquid alternately come in contact with each other, wherein the substance in the first laminar flow of the first liquid moves to the second laminar flow of the second liquid through at least one boundary between the at least one first laminar flow and the at least one second laminar flow;
 a plurality of parallel channels extending along the center channel in which the first liquid and the second liquid respectively flow, said parallel channels divided by partition walls and connected to the center channel; and
 a separating section, connected to a lower stream side of the center channel, for separating the second liquid from the first liquid.

36. The extracting method according to claim 1, wherein the separating step provides the first liquid and the second liquid to respective parallel channels divided by partition walls.

37. The separating method according to claim 9 further comprising a step of mixing the first liquid and the second liquid through turbulent flow prior to step (a).

38. The extracting structure according to claim 16 further comprising another plurality of parallel channels, divided by partition walls and disposed downstream of the center channel, which separates the second liquid from the first liquid.

39. The separating structure according to claim 25 further comprising a mixture portion which mixes the first liquid and the second liquid through turbulent flow.

40. An extracting method for incorporating a substance contained in a first liquid into a second liquid, said method comprising the steps of:
 (a) providing a chip containing a center channel;
 (b) transferring the first liquid and the second liquid in the center channel so that the first liquid and the second liquid come in contact with each other in at least four laminar flows, said at least four laminar flows containing alternating ones of the first liquid and the second liquid so that the substance in a laminar flow of the first liquid can move to a laminar flow of the second liquid; and
 (c) separating the second liquid from the first liquid in a lower stream side of the channel.

41. An extracting structure for incorporating a substance contained in a first liquid into a second liquid, said extracting structure comprising a chip containing:
 a center channel having means for allowing the first liquid and the second liquid to flow in at least four laminar flows, said at least four laminar flows containing alternating ones of the first liquid and the second liquid, wherein the substance in a laminar flow of the first liquid can move to a laminar flow of the second liquid; and
 a separating section, connected to a lower stream side of the center channel, for separating the second liquid from the first liquid.

* * * * *